United States Patent
Yang

(10) Patent No.: US 11,595,887 B2
(45) Date of Patent: Feb. 28, 2023

(54) METHOD FOR GROUPING WIFI STAS AND ASSOCIATED APPARATUS

(71) Applicant: REALTEK SEMICONDUCTOR CORPORATION, Hsinchu (TW)

(72) Inventor: Chiaoling Yang, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 24 days.

(21) Appl. No.: 17/162,363

(22) Filed: Jan. 29, 2021

(65) Prior Publication Data

US 2022/0150823 A1 May 12, 2022

(30) Foreign Application Priority Data

Nov. 10, 2020 (TW) .................................. 109139172

(51) Int. Cl.
*H04W 52/02* (2009.01)
*H04W 84/14* (2009.01)

(52) U.S. Cl.
CPC ........... *H04W 52/02* (2013.01); *H04W 84/14* (2013.01)

(58) Field of Classification Search
CPC .. H04W 52/02; H04W 52/0203; H04W 84/14
USPC ......................................................... 370/311
See application file for complete search history.

(56) References Cited

U.S. PATENT DOCUMENTS

| 9,137,823 B1* | 9/2015 | Liu .................. H04W 52/0216 |
| 10,448,333 B2* | 10/2019 | Kim ...................... H04W 74/06 |
| 2014/0153464 A1* | 6/2014 | Emeott ............. H04W 52/0216 370/311 |
| 2014/0314054 A1* | 10/2014 | Seok ...................... H04W 74/04 370/336 |
| 2015/0365885 A1* | 12/2015 | Yang ................. H04W 52/0216 370/312 |
| 2018/0317172 A1* | 11/2018 | Lepp .................. H04W 52/0235 |
| 2019/0253973 A1* | 8/2019 | Li ...................... H04W 52/0219 |
| 2019/0335394 A1* | 10/2019 | Kim ...................... H04W 74/04 |
| 2021/0068052 A1* | 3/2021 | Huang ............... H04W 52/262 |

FOREIGN PATENT DOCUMENTS

| CN | 104221443 A | 12/2014 |
| CN | 104718777 A | 6/2015 |

* cited by examiner

*Primary Examiner* — Robert J Lopata
(74) *Attorney, Agent, or Firm* — WPAT, P.C., Intellectual Property Attorneys; Anthony King

(57) ABSTRACT

The present application provides a method for a WiFi AP and a WiFi STA. For the WiFi AP, the method includes: being connected by a plurality of WiFi STAs s; performing a grouping operation upon the WiFi STAs; and configuring an ID of each of the WiFi STAs according to a result of the grouping operation. For the WiFi STA, the method includes: connecting to a WiFi AP; receiving an AID from the WiFi AP; and determining the time to exit doze state for receiving beacon according to the AID.

13 Claims, 5 Drawing Sheets

METHOD FOR GROUPING WIFI STAS AND ASSOCIATED APPARATUS

CROSS-REFERENCE TO RELATED APPLICATIONS

This application claims priority of Taiwan application No. 109139172 filed on Nov. 10, 2020, which is incorporated by reference in its entirety.

TECHNICAL FIELD

The present application relates to a method for WiFi; in particular, to a method for grouping method STAs and associated apparatus.

BACKGROUND

When a WiFi station (STA) connects to a WiFi access point (AP), the WiFi STA may enter the doze state to save power and wake up periodically to receive beacons to know if there is any buffered data in the WiFi AP. If there is any buffered data in the WiFi AP, the WiFi STA should send a packet to retrieve the buffered data. However, as the number of WiFi STAs increases, all WiFi STAs would receive beacons and send packets at the same time, resulting in a higher chance of signal collision, thereby lowering the overall efficiency and resulting in higher power consumption. Therefore, a method is needed to improve the above-mentioned issue.

SUMMARY OF THE INVENTION

The present application discloses a method for use in a WiFi AP, wherein the method includes: being connected by a plurality of WiFi STAs; performing a grouping operation upon the plurality of WiFi STAs; and configuring an identifier (ID) of each of the plurality of WiFi STAs according to the result of the grouping operation.

The present application discloses a WiFi AP, including: a non-transitory computer-readable medium, having computer-readable instructions stored therein; a receiver circuit; a transmitter circuit; and a processor, coupled to the non-transitory computer-readable medium, the receiver circuit and the transmitter circuit, wherein the non-transitory computer-readable medium and the computer-readable instructions allow the WiFi AP to perform the above-mentioned method via the processor.

The present application discloses a method for use in a WiFi STA, wherein the method includes: connecting to a WiFi AP; receiving an association ID (AID) from the WiFi AP; and determining a time point for exiting doze state periodically according to the AID to receive the notification from the WiFi AP.

The methods and devices described above can reduce the overall waiting time and power consumption for the WiFi STA to retrieve buffered data.

DETAILED DESCRIPTION

The WiFi STA may enter the doze state to save power and wake up periodically to receive beacons from the WiFi AP, so as to receive the unicast or broadcast information (TIM) that will be carry in the beacon. However, as the number of WiFi STAs increases, a plurality of WiFi STAs would simultaneously receive the TIM and perform corresponding actions, which may cause conflicts. For example, when a plurality of WiFi STAs send request to the WiFi AP asking to retrieve data buffered in the WiFi AP, the possibility that the signals transmitted by the plurality of WiFi STAs collide also increases, which results in re-competition and re-transmittance, thereby prolonging the overall time that all of the WiFi STAs retrieve the buffered data; that is, the overall waiting time increases. Moreover, since the WiFi STA may return to the doze state once again until it retrieves the buffered data, the increase of the overall waiting time also result in the increase of overall power consumption. The present application discloses methods and devices for use in the WiFi AP and WiFi STA, which can address the above-mentioned issue without incorporating complex handshake mechanisms.

Figure 1:
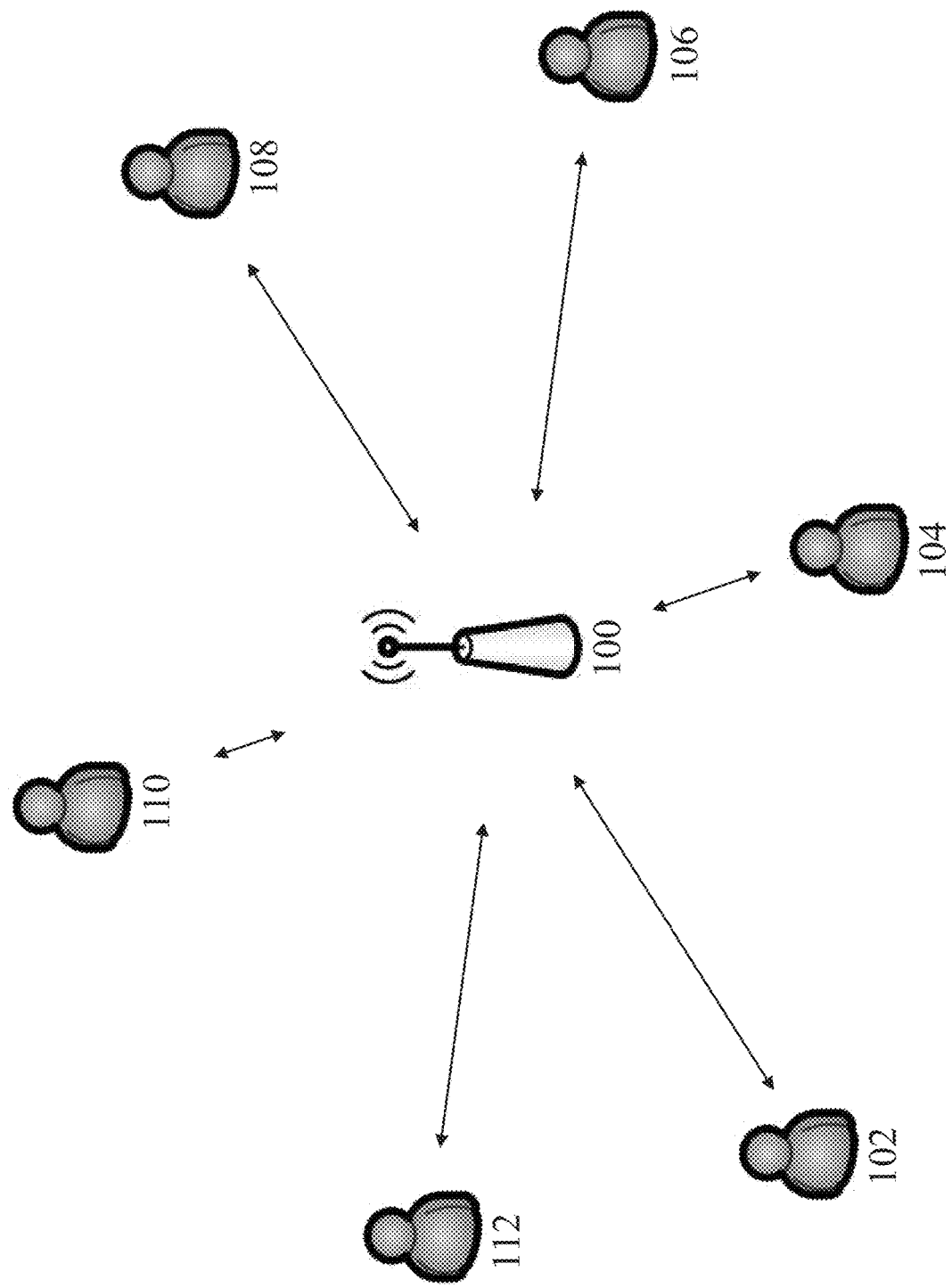
FIG. 1 is a schematic diagram illustrating a WiFi AP and a WiFi STA.

FIG. 1 is a schematic diagram illustrating a WiFi AP 100 and WiFi STAs 102~112. The method according to embodiments of the present application can reduce the possibility of the occurrence of signal collisions among WiFi STAs 102~112, so as to decrease the overall delay time and the power consumption. The method according to embodiments of the present application does not particularly limit the number of the WiFi STA connecting to the WiFi AP 100; for example, the present method is also applicable in cases where the WiFi AP 100 is only connected by only one of the WiFi STAs 102~112; however, as could be appreciated, when the WiFi AP 100 is connected by more WiFi STAs, the technical effect attained by the method according to embodiments of the present application is more significant. Furthermore, the WiFi AP 100 and WiFi STAs 102, 104, 108, 110 in FIG. 1 have the capability of performing the present method (hereinafter, the specific capability); whereas WiFi STAs 106 and 112 are conventional devices that do not have the specific capability, yet the WiFi AP 100 is compatible with WiFi STAs 106 and 112.

In the method according to embodiments of the present application, after the connection between the WiFi AP 100 and the WiFi STAs 102~112 is established, a grouping operation are performed on the plurality of the WiFi STAs 102~112. During the grouping operation, the WiFi AP 100 determines whether the WiFi STAs 102~112 have the specific capability; e.g., the WiFi AP 100 can identify whether the WiFi STAs 102~112 have the specific capability according to the respective information it obtains when establishing the connection with each of the WiFi STAs 102~112. The WiFi AP 100 groups the WiFi STAs 102, 104, 106, 108, 110, 112 into the first group to the Nth group, wherein all the WiFi STA 106 and 112 without the specific capability are grouped into the Nth group, wherein N is an integer greater than 1, and the number N is set according to the delivery traffic indication message (DTIM) period (details about the DTIM period are discussed below); in the present embodiment, N equals to the DTIM period. In the present application, the Nth group can also include the WiFi STA having the specific capability; for example, when the number of the WiFi STA without the specific capability is very small or zero, the Nth group will inevitably be assigned with WiFi STAs having the specific capability. For example, the DTIM period is 3, then N is set as 3; therefore, the WiFi AP 100 groups the WiFi STAs 102, 104, 108, 110 into the first group to the second group, and the WiFi STAs 106 and 112 are grouped into the third group.

Next, the WiFi AP 100 configures a unique ID to each of the WiFi STAs 102~112 according to the result of the grouping operation; for example, in the present embodiment, the ID is an associated ID (AID). WiFi STAs 102, 104, 108, 110 having the specific capability are able to infer their corresponding group based on the AIDs assigned to them, so as to perform subsequent operations correspondingly. For example, the WiFi AP 100 can configure the AID of the WiFi STAs in the Mth group (AID modulo N=M), and configured the AID of the WiFi STAs in the Nth group (AID modulo N=0), wherein M is an integer between 1 to N−1. In the present embodiment, N is 3, and the configured AID of the WiFi STAs 102~112 can be seen in Table 1.

TABLE 1

| WiFi STA | Group | AID |
|---|---|---|
| 102 | $1^{st}$ | 1 |
| 104 | $2^{nd}$ | 2 |
| 106 | $3^{rd}$ | 3 |
| 108 | $1^{st}$ | 4 |
| 110 | $2^{nd}$ | 5 |
| 112 | $3^{rd}$ | 6 |

Figure 2:
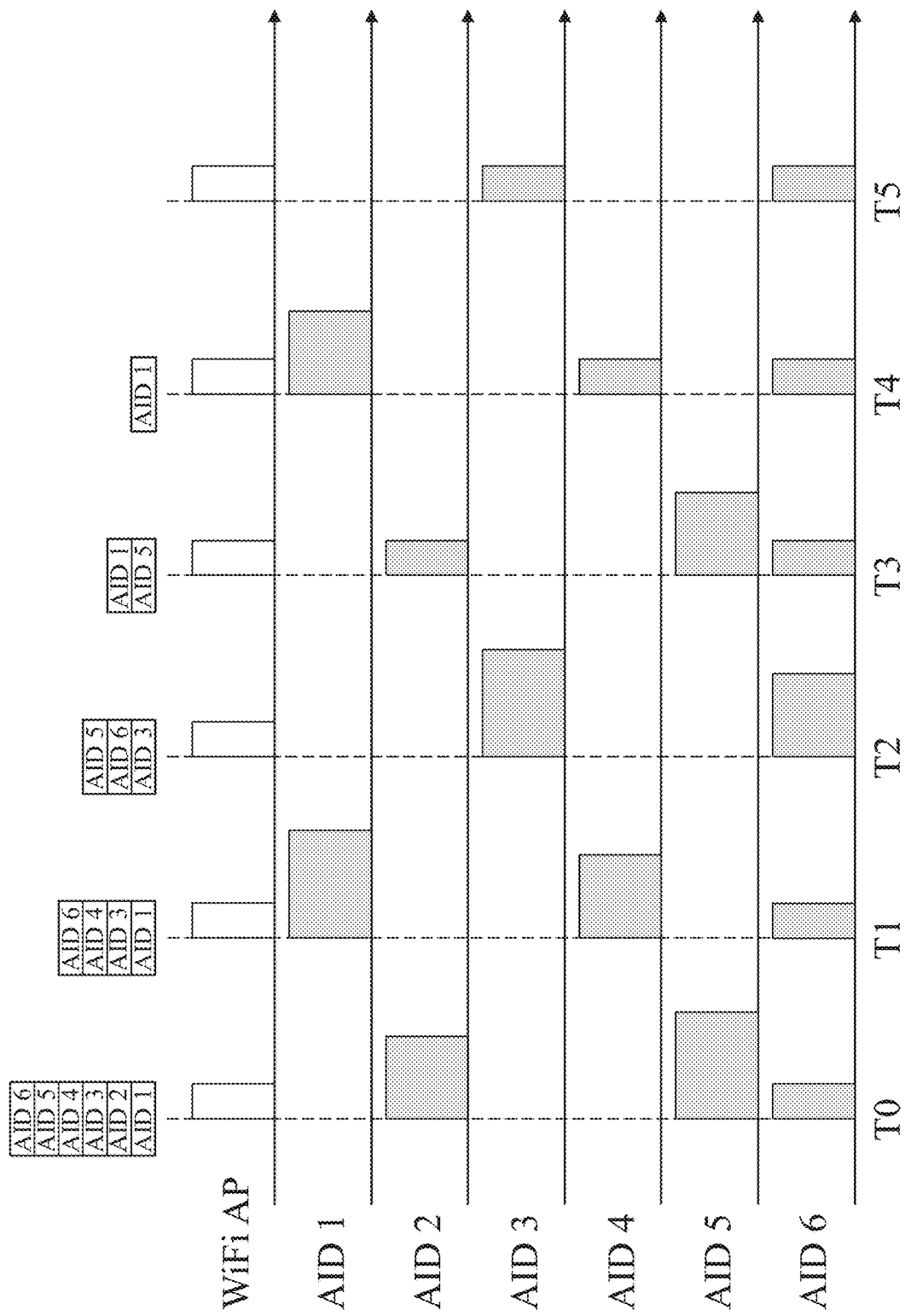
FIG. 2 is a timing diagram according to the embodiment where the WiFi AP performing a unicast operation to the WiFi STA.

FIG. 2 is a timing diagram according to the embodiment where the WiFi AP 100 performing a unicast operation to WiFi STAs 102~112. In the present embodiment, the WiFi AP 100 sends a beacon at a plurality time points T0, T1, T2, . . . with a fixed interval, so as to notify the WiFi STAs 102~112 to retrieve the data buffered in the WiFi AP 100. Embodiments of the present application differs from the conventional approach in that the plurality of WiFi STAs are notified group by group so as to achieve traffic dispersion, instead of notifying all WiFi STAs having to retrieve the buffered data at the same time.

Specifically, the conventional WiFi AP performs unicasting according to the beacon period and performs broadcasting according to the DTIM period; for example, the conventional WiFi AP would send the unicast notification at time point T0 to T5, wherein at each time, it notifies all WiFi STAs having to retrieve the buffered data; and the conventional WiFi AP only sends the broadcasting notification at time point T2 and T5. In contrast, embodiments of the present application would perform both unicast and broadcast notifications at time point T0 to T5; however, the notifications will not notify all WiFi STAs having to retrieve the buffered data; rather, different groups are notified at different time point.

TABLE 2

| Time | T0 | T1 | T2 | T3 | T4 | T5 |
|---|---|---|---|---|---|---|
| DTIM count | 2 | 1 | 0 | 2 | 1 | 0 |
| Notification group | $2^{nd}$ | $1^{st}$ | $3^{rd}$ | $2^{nd}$ | $1^{st}$ | $3^{rd}$ |

The WiFi AP 100 determines the time point for notifying the WiFi STAs 102~112 according to the AID of each of the WiFi STAs 102~112. For example, the WiFi AP 100 only notifies the WiFi STAs of the Mth group in beacons corresponding to the DTIM count equal to M, so as to notify the WiFi STAs in the Mth group to retrieve the buffered data; and only notifies the WiFi STAs of the Nth group in beacons corresponding to the DTIM count equal to 0, so as to notify the WiFi STAs in the Nth group to retrieve the buffered data. In other words, the WiFi AP 100 only notifies the WiFi STAs of the first group in beacons corresponding to the DTIM count equal to 1, only notifies the WiFi STAs of the second group in beacons corresponding to the DTIM count equal to 2, only notifies the WiFi STAs of the third group in beacons corresponding to the DTIM count equal to 0. The variation of the DTIM counts is shown in Table 2, from time points T0 to T5, the WiFi STAs 102 and 108 in the first group can only receive beacons send at T1 and T4 and will remain in the doze state when the beacons are sent at T0, T2, T3, T5; the WiFi STAs 104 and 110 in the second group can only receive beacons send at T0 and T3 and will remain in the doze state when the beacons are sent at T1, T2, T4, T5. To the WiFi STAs 106 and 112 in the third group, the beacons are received as the conventional approach; for example, in the conventional WiFi AP, the WiFi STA 106 can only receives beacons at T2 and T5 (i.e., the time point at which the conventional WiFi AP transmits the broadcast notification), or the WiFi STA 112 receives all beacons at T0 to T5.

In FIG. 2, the gray blocks represent the time period at which the WiFi STAs with AID 1 to 6 must exit doze state and receive the beacon of the WiFi AP 100, the TIM in in the beacon indicates the data currently buffered in the WiFi AP 100 corresponds to which WiFi STAs (represented by AID). At time point T0, the data for AID 1~AID6 are available to be retrieved; according to Table 2 and Table 1, at time point T0, the unicast information carried in the beacon transmitted by the WiFi AP 100 is only for the WiFi STAs in the second group (i.e., AID 2 and AID 5), so the WiFi STAs in the second group must exit doze state and retrieve the data; WiFi STAs in the first group are kept in the doze state; on the other hand, although the WiFi STA 112 (AID 6) would receive the beacon, but it enters the doze state once it confirms that the beacon does not carry the notification to the AID 6. At time point T1, since the data for the AID 2 and AID 5 have been retrieved, only data for AIDs 1, 3, 4, 6 are left to be retrieved. In the meantime, the unicast information carried in the beacon transmitted by the WiFi AP 100 only for the WiFi STAs in the first group (i.e., AID 1 and AID 4), so the WiFi STAs in the first group must exit doze state and retrieve the data; WiFi STAs in the second group are kept in the doze state; similarly, the WiFi STA 112 enters the doze state once it confirms that the beacon does not carry the notification to the AID 6.

At time point T2, since the data for the AID 1 and AID 4 have been retrieved, only data for AIDs 3, 6 are left to be retrieved, but at that time, a new data for AID 5 is newly added. In the meantime, unicast information carried in the beacon transmitted by the WiFi AP 100 is only for the WiFi STAs in the third group (i.e., AID 3 and AID 6), so the WiFi STAs in the third group must exit doze state and retrieve the data; whereas the WiFi STAs in the first and second groups are kept in the doze state.

The same applies to subsequent cases, and is not repeated herein. It should be noted that when the two WiFi STAs in the same group are retrieving the buffered data, one of them would retrieve the data before the other does. If using the conventional approach, all of the six WiFi STAs would be notified to retrieve the data at the time point T0, which inevitably would result in more serious competition.

Figure 3:
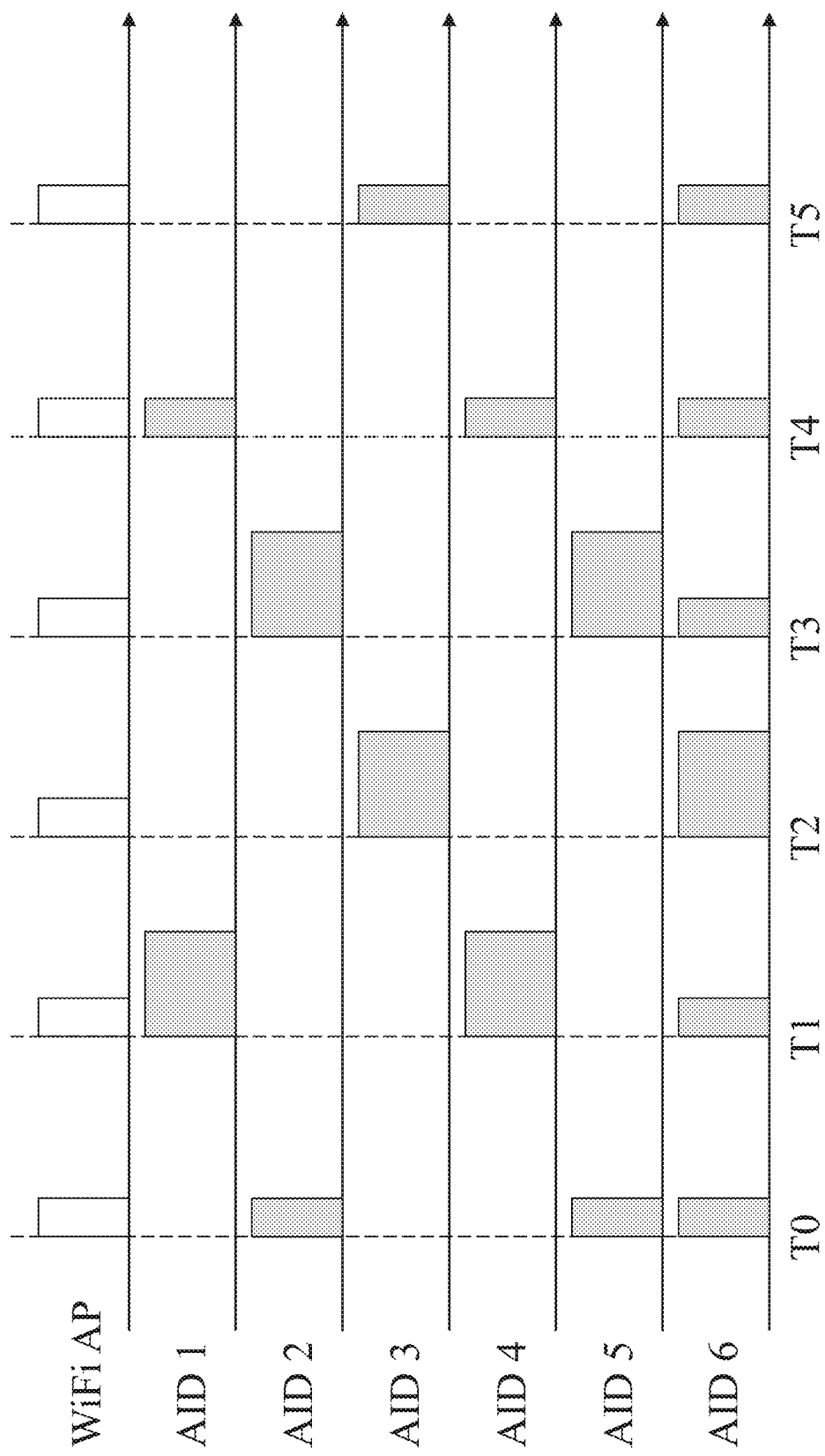
FIG. 3 is a timing diagram according to the embodiment where the WiFi AP performing a broadcast operation to the WiFi STA.

FIG. 3 is a timing diagram according to the embodiment where the WiFi AP 100 performing a broadcast operation to the WiFi STAs 102~112. Since WiFi STAs in different groups would exit the doze state at different time points, it is not feasible to broadcast to all WiFi STAs at the same time, and instead, the broadcasting should be performed in groups. For example, at the time point T1, the WiFi STAs in the first group are notified; at the time point T2, the WiFi STAs in the third group are notified; at the time point T3, the WiFi STAs in the second group are notified. The advantage of such implementation is that broadcasting cane be performed on any one group.

In view of the foregoing, the present application can reduce the number of the WiFi STAs that retrieve the buffered data at the same time without additional handshake mechanisms, thereby reducing the overall waiting time and power consumption. Moreover, there is no compatibility issue.

Figure 4:
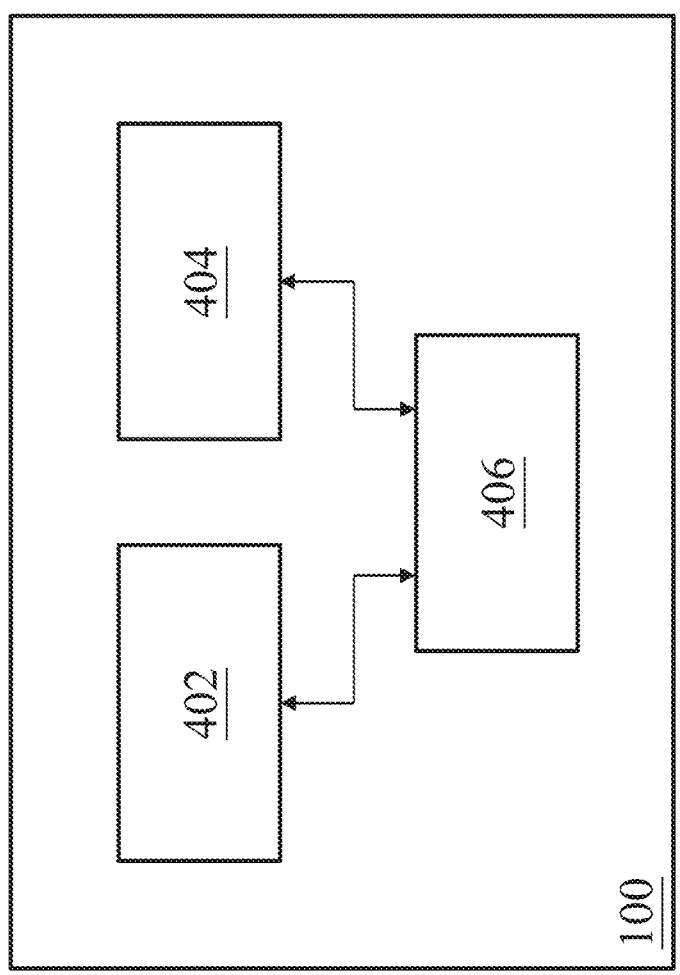
FIG. 4 is a schematic diagram illustrating a WiFi AP according to one embodiment of the present application.

FIG. 4 is a schematic diagram illustrating a WiFi AP 100 according to embodiments of the present application. The WiFi AP 100 includes a receiver circuit 402, a transmitter circuit 404, a processor 406 and a non-transitory computer-readable medium (not shown in the drawing) having computer-readable instructions stored therein. The processor 406 is coupled to the non-transitory computer-readable medium, the receiver circuit 402 and the transmitter circuit 404, wherein the non-transitory computer-readable medium and the computer-readable instructions allows the WiFi AP 100 to perform the method according to embodiments of the present application via the processor 406.

Figure 5:
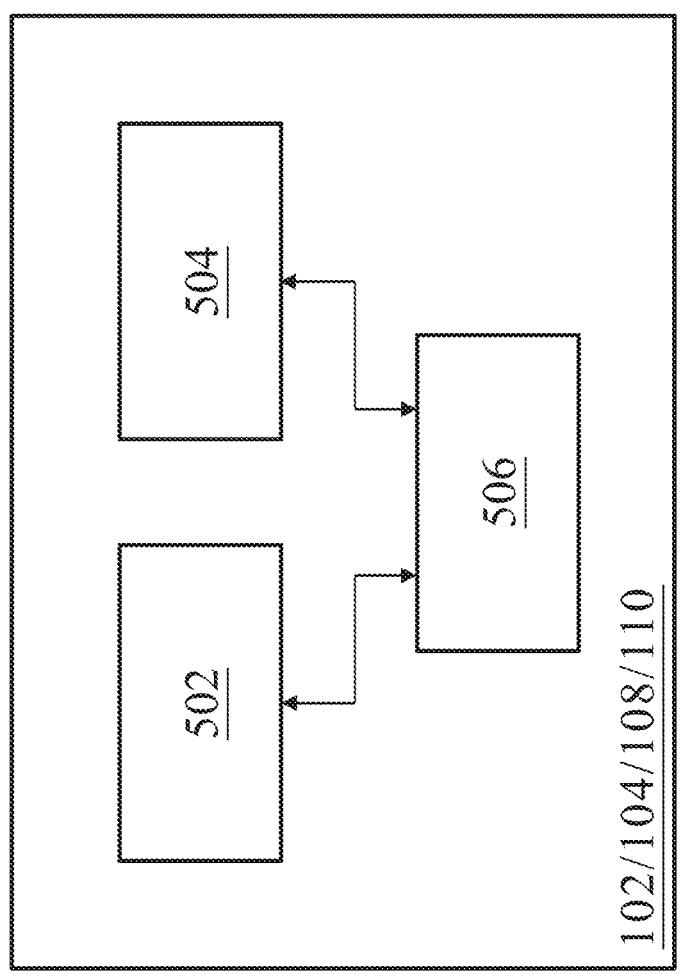
FIG. 5 is a schematic diagram illustrating a WiFi STA according to one embodiment of the present application.

FIG. 5 is a schematic diagram illustrating WiFi STAs 102/104/108/110 according to embodiments of the present application. Each of the WiFi STA 102/104/108/110 includes a circuit 502, a transmitter circuit 504, a processor 506 and a non-transitory computer-readable medium (not shown in the drawing) having computer-readable instructions stored therein. The processor 506 is coupled to the non-transitory computer-readable medium, the receiver circuit 502 and the transmitter circuit 504, wherein the non-transitory computer-readable medium and the computer-readable instructions allow the WiFi STAs 102/104/108/110 to perform the method according to embodiments of the present application via the processor 506.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A method for use in a WiFi access point (AP), comprising:
   being connected by a plurality of WiFi stations (STAs);
   performing a grouping operation upon the plurality of WiFi STAs;
   configuring an identifier (ID) of each of the plurality of WiFi STAs according to a result of the grouping operation, comprising:
      configuring an association ID (AID) of each of the plurality of WiFi STAs according to the result of the grouping operation; and
   determining a time point for sending out a unicast notification and a broadcast notification to the plurality of WiFi STAs according to the AID of each of the plurality of WiFi STAs;
wherein the step of performing the grouping operation upon the plurality of WiFi STAs comprises:
   determining whether the plurality of WiFi STAs have a specific capability, wherein the WiFi STA having the specific capability is able to determine, correspondingly, a time point for exiting doze state periodically according to the configured AID to receive the notification from the WiFi AP.

2. The method of claim 1, wherein the step of performing the grouping operation upon the plurality of WiFi STAs further comprises:
   dividing the WiFi STA having the specific capability into a first group to an Nth group, wherein a delivery traffic indication message (DTIM) period is N, and N is an integer greater than 1.

3. The method of claim 2, wherein the step of performing the grouping operation upon the plurality of WiFi STAs further comprises:
   dividing the WiFi STA without the specific capability into the Nth group.

4. The method of claim 3, wherein the step of configuring the ID of each of the plurality of WiFi STA according to the result of the grouping operation comprises:
   configuring the AID of the WiFi STA of the Mth group, wherein M is the remainder of the division of AID by N, wherein M is an integer between 1 to N-1; and
   configuring the AID of the WiFi STA of the Nth group to have a residue equal to 0 when being divided by N;
   wherein the AID of each of the plurality of WiFi STAs differs from one another.

5. The method of claim 4, wherein the step of determining the time point for sending out a notification to the plurality of WiFi STA according to the AID of each of the plurality of WiFi STAs comprises:
   only sending out the notification to the WiFi STA of the Mth group in a beacon corresponding to a DTIM count equal to M; and
   only sending out the notification to the WiFi STA of the Nth group in a beacon corresponding to the DTIM count equal to zero.

6. The method of claim 5, wherein the notification is unicasting.

7. The method of claim 6, wherein the step of only sending out the notification to the WiFi STAs of the Mth group in the beacon corresponding to a DTIM count equal to M comprises:
   notifying the WiFi STA of the Mth group to retrieve buffered data.

8. The method of claim 6, wherein the step of only sending out the notification to the WiFi STAs of the Nth group in the beacon corresponding to the DTIM count equal to zero comprises:

notifying the WiFi STA of the Nth group to retrieve buffered data.

9. The method of claim 5, wherein the notification is broadcasting.

10. A WiFi AP, comprising:
non-transitory computer-readable medium, having computer-readable instructions stored therein;
a receiver circuit;
a transmitter circuit; and
a processor, coupled to the non-transitory computer-readable medium, the receiver circuit and the transmitter circuit, wherein the non-transitory computer-readable medium and the computer-readable instructions cause the WiFi AP to perform the method of claim 1 via the processor.

11. A method for use in a WiFi STA, comprising:
connecting to a WiFi AP;
receiving an AID from the WiFi AP; and
determining a time point for exiting doze state periodically according to the AID to receive a unicast notification and a broadcast notification from the WiFi AP;
wherein a DTIM period is N, and N is an integer greater than 1; and the residue of the AID of the WiFi STA divided by N is M, wherein M is an integer between 0 to N-1, and the step of determining the time point for exiting the doze state periodically according to the AID to receive the notification from the WiFi AP comprises:
exiting the doze state to receive a beacon corresponding to a DTIM count equal to M so as to receive the notification.

12. The method of claim 11, wherein the step of determining the time point for exiting the doze state periodically according to the AID to receive the notification from the WiFi AP further comprises:
staying in the doze state and do not receive a beacon corresponding to a DTIM count not equal to M.

13. The method of claim 11, further comprising the step of:
retrieving buffered data from the WiFi AP according to the notification.

* * * * *